(12) United States Patent
Kamimura et al.

(10) Patent No.: US 7,810,988 B2
(45) Date of Patent: Oct. 12, 2010

(54) FLUID MIXER FOR MIXING FLUIDS AT AN ACCURATE MIXING RATIO

(75) Inventors: Shinobu Kamimura, Nobeoka (JP); Kenro Yoshino, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 788 days.

(21) Appl. No.: 10/552,308

(22) PCT Filed: Apr. 7, 2004

(86) PCT No.: PCT/JP2004/005051
§ 371 (c)(1),
(2), (4) Date: Feb. 2, 2006

(87) PCT Pub. No.: WO2004/094053
PCT Pub. Date: Nov. 4, 2004

(65) Prior Publication Data
US 2006/0285429 A1  Dec. 21, 2006

(30) Foreign Application Priority Data
Apr. 7, 2003  (JP) .............................. 2003-103503

(51) Int. Cl.
*B01F 15/04* (2006.01)
(52) U.S. Cl. .................. 366/160.2; 366/162.1
(58) Field of Classification Search ............. 366/153.2, 366/151.1, 152.1, 152.3, 152.4, 162.1, 152.2, 366/160.1, 160.2
See application file for complete search history.

(56) References Cited
U.S. PATENT DOCUMENTS 3,877,682 A * 4/1975 Moss .......................... 366/132
4,171,191 A * 10/1979 Krueger .................... 366/160.2
4,219,038 A * 8/1980 Lubitzsch et al. .............. 137/7
4,277,254 A * 7/1981 Hanson ..................... 48/189.1
4,420,008 A * 12/1983 Shu ............................... 137/4

(Continued)

FOREIGN PATENT DOCUMENTS

JP         52-87889         7/1977

(Continued)

*Primary Examiner*—Charles E Cooley
(74) *Attorney, Agent, or Firm*—Jordan and Hamburg LLP

(57) ABSTRACT

A fluid mixer is provided which can supply a fixed amount of fluid in each of supply lines to a mixing line all the time while maintaining a highly accurate mixing ratio even if a pressure on the downstream side of a back pressure valve of the mixing line is fluctuated and moreover can change the mixing ratio of the fluids in the supply lines with high accuracy in the state where the fluids are flowed. On the upstream side from a merging point where at least two supply lines: a first supply line and a second supply line are merged to a mixing line, diaphragm parts for adjusting the flow rates of the fluids and pressure reducing valves are arranged on the further upstream side of the diaphragm parts in series with the supply lines and a back pressure valve is arranged in the mixing line. Also, the back pressure valve and a flow meter are arranged in series in the mixing line, a fixed orifice or an regulating valve is used for the diaphragm parts and the pressure reducing valves and the back pressure valve are automatic valves.

4 Claims, 7 Drawing Sheets

U.S. PATENT DOCUMENTS

| | | | | |
|---|---|---|---|---|
| 4,776,977 | A | * | 10/1988 | Taylor .......................... 516/53 |
| 4,964,732 | A | * | 10/1990 | Cadeo et al. ............. 366/152.1 |
| 5,261,452 | A | * | 11/1993 | McAndrew et al. ......... 137/896 |
| 5,332,311 | A | * | 7/1994 | Volk et al. .................. 366/134 |
| 5,372,421 | A | * | 12/1994 | Pardikes ..................... 366/137 |
| 5,482,368 | A | * | 1/1996 | Nakamura et al. ....... 366/152.2 |
| 5,968,268 | A | * | 10/1999 | Kitano et al. ................. 118/52 |
| 6,050,283 | A | * | 4/2000 | Hoffman et al. ................ 137/3 |
| 6,105,631 | A | * | 8/2000 | Pittroff et al. ............ 222/145.1 |
| 6,224,778 | B1 | * | 5/2001 | Peltzer ....................... 210/739 |
| 6,280,692 | B1 | * | 8/2001 | Bartlett, Jr. ................. 422/131 |
| 6,494,608 | B1 | * | 12/2002 | Retamal et al. ............. 366/132 |
| 6,546,962 | B1 | * | 4/2003 | Sunde |
| 6,767,124 | B2 | * | 7/2004 | Shikami et al. .......... 366/152.2 |
| 6,799,883 | B1 | * | 10/2004 | Urquhart et al. ......... 366/152.4 |
| 6,923,568 | B2 | * | 8/2005 | Wilmer et al. ........... 366/152.1 |
| 7,287,540 | B2 | * | 10/2007 | Hammonds et al. |
| 7,377,685 | B2 | * | 5/2008 | Breithaupt ............... 366/152.2 |
| 2001/0015222 | A1 | * | 8/2001 | Lewit et al. .................... 137/2 |
| 2001/0032668 | A1 | * | 10/2001 | Doty et al. ..................... 137/3 |
| 2002/0044494 | A1 | * | 4/2002 | Steinberger et al. ...... 366/152.1 |
| 2002/0144727 | A1 | * | 10/2002 | Kashkoush et al. ........... 137/93 |
| 2003/0031086 | A1 | * | 2/2003 | Shikami et al. .......... 366/160.2 |
| 2003/0198125 | A1 | * | 10/2003 | Linsen et al. ............ 366/152.1 |
| 2004/0056234 | A1 | * | 3/2004 | Belt et al. .................... 252/372 |
| 2004/0141409 | A1 | * | 7/2004 | Breithaupt ................ 366/152.2 |
| 2005/0219945 | A1 | * | 10/2005 | Kelley et al. ................. 366/142 |
| 2006/0285429 | A1 | * | 12/2006 | Kamimura et al. ....... 366/160.2 |
| 2007/0089796 | A1 | * | 4/2007 | Electra Brown et al. .... 137/896 |
| 2008/0006154 | A1 | * | 1/2008 | Johansson et al. ............. 95/151 |
| 2008/0198689 | A1 | * | 8/2008 | Breithhaupt ............... 366/152.2 |
| 2009/0175738 | A1 | * | 7/2009 | Shaimi ........................ 417/248 |
| 2010/0031825 | A1 | * | 2/2010 | Kemp .......................... 99/275 |

FOREIGN PATENT DOCUMENTS

| | | | | |
|---|---|---|---|---|
| JP | 62129135 | A | * | 6/1987 |
| JP | 01047434 | A | * | 2/1989 |
| JP | 7-228783 | | | 8/1995 |
| JP | 07198554 | A | * | 8/1995 |
| JP | 10-128102 | | | 5/1998 |
| JP | 11-76779 | | | 3/1999 |
| JP | 2000-250634 | | | 9/2000 |
| JP | 2007032937 | A | * | 2/2007 |
| JP | 2009180418 | A | * | 8/2009 |

* cited by examiner

FLUID MIXER FOR MIXING FLUIDS AT AN ACCURATE MIXING RATIO

BACKGROUND OF THE INVENTION

1. Field of the Invention

The present invention relates to a fluid mixer for supplying a fixed amount of fluid flowing through at least two supply lines to a mixing line in a fluid transportation in various industries including chemical plants, semiconductor manufacture, food area, bio-related area, etc., and more particularly, to a fluid mixer which can supply a fixed amount of fluid to the mixing line while maintaining a highly accurate mixing ratio in each of the supply lines even if a pressure on the downstream side of a back pressure valve of the mixing line is fluctuated, and further can change the mixing ratio of the mixing line without pump control of the fluid in the supply lines. The fluid mixer can also change the mixing ratio of the mixing line in the state where the fluid is flowed only by adjusting a flow rate of one of the supply lines.

2. Description of the Related Art

As an example of a conventional fluid mixer is a fluid mixer shown in FIG. 7 (disclosed in Japanese Unexamined Patent Application Publication No. 2000-250634, for example). In this fluid mixer, a pump 102, a constant-pressure control valve 103, an orifice 104, a pressure gauge 105 and a check valve 106 are connected in series to a first supply passage 101 from the upstream side, and to a second supply passage 107, in the same way as the first supply passage 101, a pump 108, a constant-pressure control valve 109, an orifice 110, a pressure gauge 111 and a check valve 112 are connected in series from the upstream side and an in-line type mixer 114 is provided on a mixing passage 113 where the fluids flowing through each of the supply passages are merged.

The action is that the fluid flowing through the first supply passage 101 is fed by pressure by the pump 102 and flows into the constant-pressure control valve 103. The fluid having flowed into the constant-pressure control valve 103 has its pulsation suppressed by the action of the constant-pressure control valve 103 and set to a predetermined pressure and passes through the orifice 104 to flow into the mixing passage 113. At this time, the same action as the fluid in the first supply passage 101 also occurs at the same time in the second passage 107, and the fluid in the second passage 107 flows into the mixing passage 113. The fluids having flowed into the mixing passage 113 and merged are fed to the in-line type mixer 114, where they are stirred and mixed. At this time, the fluid flowing through each of the supply passages 101 and 107 is mixed at a predetermined ratio set in advance at the mixing passage 113 in the state where pulsation is suppressed. Moreover, by the action of the orifices 104 and 110, they are mixed at a predetermined ratio without subjected to pressure fluctuation of the in-line type mixer 114.

However, the above conventional fluid mixer has the following problems:

(1) If a diaphragm part such as nozzle for supply to a use point is provided at the end on the downstream side of the in-line type mixer 114 in the mixing passage 113, adhesion of foreign substances such as air bubbles to the nozzle increases the pressure on the downstream side of the orifices 104 and 110 and causes pressure fluctuation larger than the pressure fluctuation in the in-line type mixer 114. The orifices 104 and 110 can not respond to the pressure fluctuation, and the flow rates are lowered and the accuracy of mixing ratio is deteriorated.

(2) If a valve or the like is provided at the mixing passage 113 for opening/closing, when the pressure of the mixing passage 113 is fluctuated, the flow rates are also lowered as in the above (1) and the accuracy of the mixing ratio is deteriorated.

(3) If the flow rate of the fluid in one of the supply passages is changed so as to change the mixing ratio, the pressure on the downstream side of the orifice 104 or 110 on the other of the supply passage is fluctuated, the same phenomenon as in the above (1) occurs and mixing at a desired mixing ratio can not be realized.

SUMMARY OF THE INVENTION

The present invention has an object to provide a fluid mixer which can supply a fixed amount of fluids flowing through at least two supply lines to a mixing line, supply the fluid in each of the supply lines at the fixed amount to the mixing line all the time even if the pressure on the downstream side of a back pressure valve of the mixing line is fluctuated, maintain an accurate mixing ratio and change the mixing ratio of the fluids in the supply lines with high accuracy in the state where the fluids are flowed.

The construction of the present invention to solve the above problems will be described referring to FIG. 1. In FIG. 1, on the upstream side from a merging point 4 where at least two supply lines: a first supply line 1 and a second supply line 2 are merged to a mixing line 3, diaphragm parts 5 and 6 for adjusting the flow rates of the fluids and pressure reducing valves 7 and 8 are arranged in series on the further upstream side of the diaphragm parts 5 and 6, and a back pressure valve 9 is arranged in the mixing line 3, which constitutes a first characteristic.

The arrangement of the back pressure valve 9 and the flow meter 10 in series in the mixing line 3 is a second characteristic, use of a fixed orifice or a regulating valve for the diaphragm parts 5 and 6 is a third characteristic, and the constitution that the pressure reducing valves 7 and 8 and the back pressure valve 9 are automatic valves is a fourth characteristic.

DESCRIPTION OF THE PREFERRED EMBODIMENTS

Figure 1:
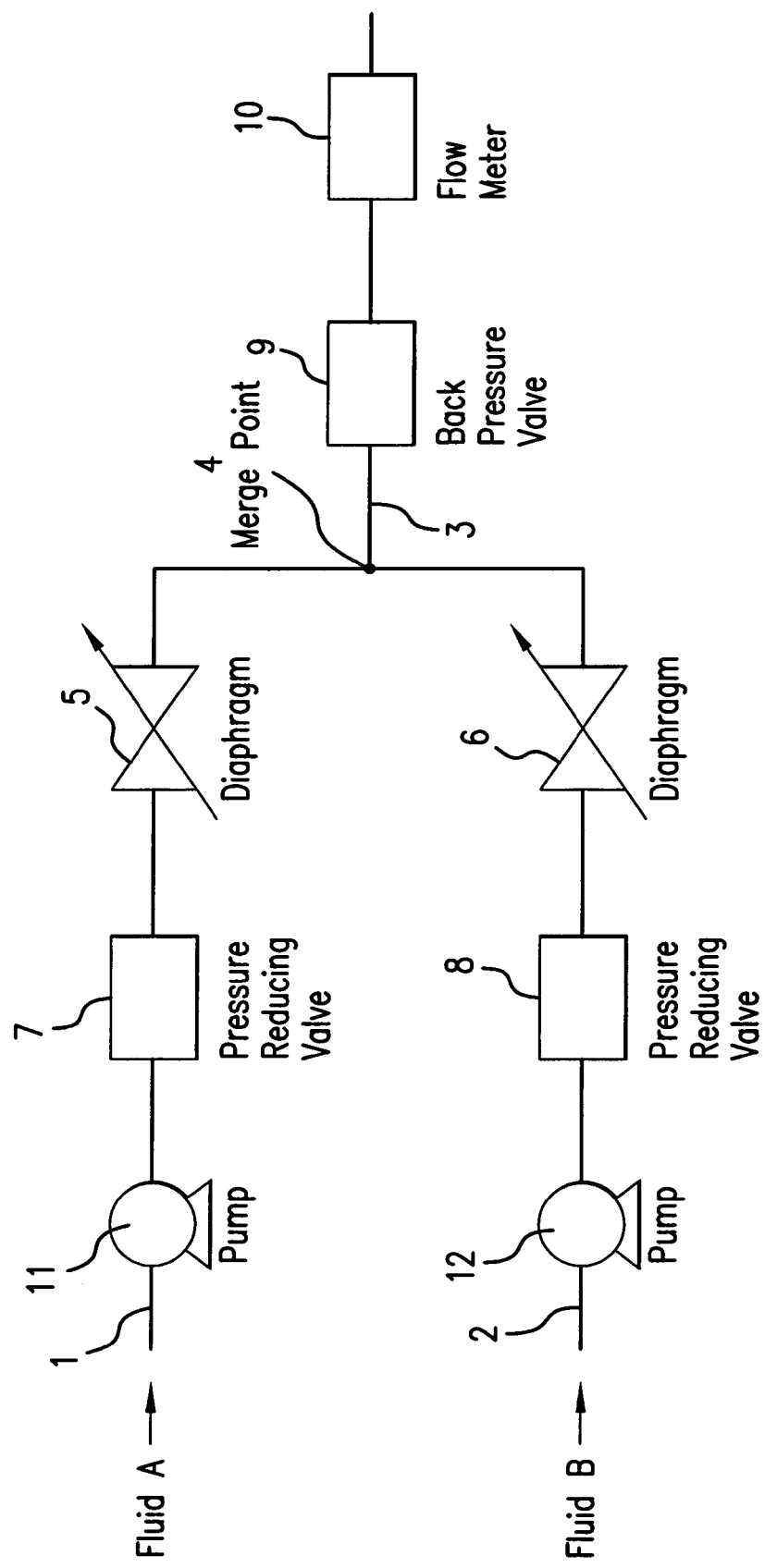
FIG. 1 is a block diagram schematically showing a first preferred embodiment of the present invention.

A preferred embodiment of the present invention will be described in detail referring to the drawings, but it is needless to say that the present invention is not limited to this preferred embodiment.

A first preferred embodiment of the present invention will be described based on FIGS. 1 and 3. Reference numeral 1 is a first supply line through which a fluid A flows, in which from the upstream side, a pump 11, a pressure reducing valve 7 and a needle valve 5, which is a diaphragm part, are arranged in series, while reference numeral 2 is a second supply line through which a fluid B flows, in which, similarly to the first supply line 1, a pump 12, a pressure reducing valve 8 and a needle valve 6, which is a diaphragm part, are arranged in series from the upstream side. Reference numeral 4 is a merging point in this device and a point where the fluids A and B, supplied in a fixed amount, respectively, are merged. Reference numeral 3 is a mixing line, which is a line on the downstream side from the merging point 4. In the mixing line 3, a back pressure valve 9 and a flow meter 10 are arranged in series. Moreover, on its downstream side, an in-line type mixer may be provided, though not shown, for evenly mixing the fluids A and B, or instruments for measuring concentration, pH, etc. may be provided. In this preferred embodiment, the back pressure valve 9 and the flow meter 10 are sequentially arranged in the mixing line 3 from the merging point 4 toward the downstream side, but, they may be arranged reversely in the following order from the flow meter 10 to the back pressure valve 9. The members arranged in each line will be described below in detail.

The pumps 11 and 12 are bellows pumps without a sliding portion for pressure feed of the fluid to each of the supply lines 1 and 2. A bellows pump is used in this preferred embodiment, but not limited to this preferred embodiment, or regardless of occurrence of pulsation, any type of pump may be used.

Figure 3:
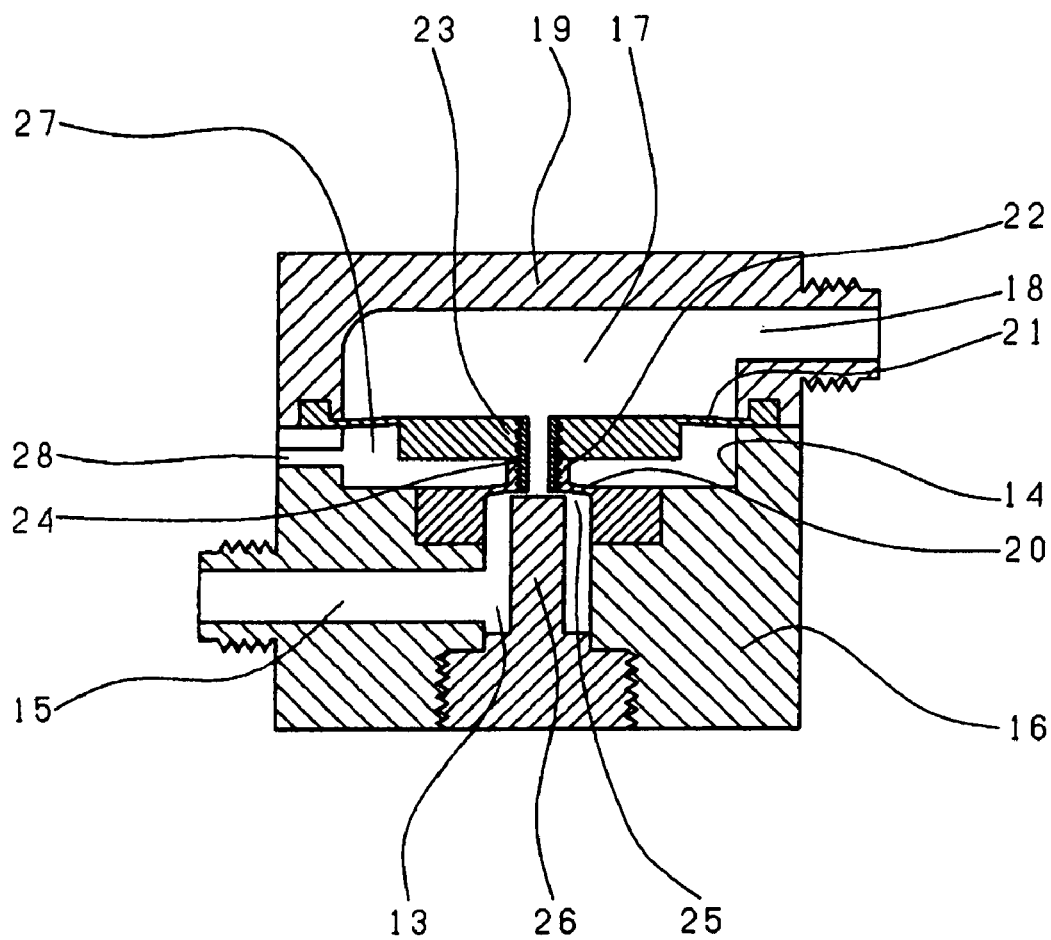
FIG. 3 is a vertical sectional view of a pressure reducing valve.

The pressure reducing valves 7 and 8 are for pressure adjustment, flow rate regulation and pulsation suppression of each of the fluids A and B, and a preferable example is shown in FIG. 3. The construction comprises a main body 16 having a first valve chamber 13, a stepped portion 14 provided on the upper part of the first valve chamber 13 and a fluid inlet 15 communicating with the first valve chamber 13 therein, a lid body 19 having a second valve chamber 17 and a fluid outlet 18 communicating therewith and joined to the upper part of the main body, a first diaphragm 20 having a peripheral edge part joined to the upper peripheral edge part of first valve chamber 13, a second diaphragm 21 with the peripheral edge part held between the main body 16 and the lid body 19, a sleeve 24 joined to both annular joining portions 22 and 23 provided at the center of the first and the second diaphragms 20 and 21 and moveable in the axial direction, and a plug 26 fixed to the bottom portion of the first valve chamber 13 and forming a fluid control part 25 between it and the lower end of the sleeve 24. The construction also has an air chamber 27 surrounded by the inner circumferential surface of the stepped portion 14 of the main body and the first and the second diaphragms 20 and 21, in which a pressure receiving area of the second diaphragm 21 is constructed larger than the pressure receiving area of the first diaphragm 20, and an air supply port 28 communicating with the air chamber 27 is provided on the main body.

The action is that a predetermined internal pressure is applied to the air chamber 27 by manipulation air and first, the first diaphragm 20 receives a pressure in the first valve chamber 13, that is, an upward force by a fluid pressure on the primary side and a downward force by a pressure in the air chamber 27 to which a predetermined internal pressure is applied by manipulation air. In the meantime, the second diaphragm 21 receives a pressure in the second valve chamber 17, that is, a downward force by a fluid pressure on the secondary side and an upward force by a pressure in the air chamber 27. And the position of the sleeve 24 joined to the first and the second diaphragms 20 and 21 is determined by the balance of these four forces. The sleeve 24 forms the fluid control part 25 between it and the plug 26 and controls the fluid pressure on the secondary side with its opening area.

If the fluid pressure on the primary side is raised in this state, the fluid pressure and flow rate of the secondary side is also temporarily increased. At this time, an upward force works on the first diaphragm 20 and a downward force on the second diaphragm 21 by the fluid pressure, but since the pressure receiving area of the second diaphragm 21 is designed sufficiently larger than that of the first diaphragm 20, the downward force overcomes the upward force, and as a result, the sleeve 24 is pressed downward. By this, the opening area of the fluid control part 25 is decreased, the fluid pressure on the secondary side is lowered to the original pressure instantaneously, and the internal pressure of the air chamber 27 is balanced again with the force by the fluid pressure.

In the meantime, when the fluid pressure on the primary side is lowered, the fluid pressure on the secondary side and the flow rate are also lowered temporarily. At this time, a downward force and an upward force act on the first and the second diaphragms 20 and 21, respectively, by the internal pressure of the air chamber 27. But even in this case, since the pressure receiving area of the second diaphragm 21 is larger, the upward force overcomes the downward force and presses the position of the sleeve 24 upward. By this, the opening area of the fluid control part 25 is increased, the fluid pressure on the secondary side is raised instantaneously to the original pressure, and the force balance is kept again between the internal pressure of the air chamber 27 and the fluid pressure. The original flow rate is also maintained.

As mentioned above, even though the fluid pressure on the primary side of the pressure reducing valves 7 and 8 is increased/decreased, the position of the sleeve 24 is instantaneously changed so that the pressure on the secondary side is kept constant all the time. Therefore, even if the inflowing fluid has pulsation, a fluid of which pressure is constantly controlled flows out of the outlet. Moreover, by pouring manipulation air to the air supply port 28 and by adjusting this manipulation air pressure, the degree of pressure reduction of the fluid can be adjusted and the flow rate can also be regulated.

As for materials of the members, it is particularly useful to use a fluorine resin such as PTFE for the diaphragms 20 and 21 and a resin such as PP for the main body, but other resins or metals may be used. In feedback control or the like, it is further effective if the valve is used as an automatic valve which can adjust the pressure reduction degree of fluid by an air pressure signal or an electric signal. The pressure reducing valves 7 and 8 are the same in this preferred embodiment, but they should not necessarily be the same only if they have an action of pressure control, flow rate regulation and pulsation suppression of each of the fluids and not limited to those having the above structure.

The needle valves 5 and 6 regulate flow rates by varying the opening area of the flow passage. A needle valve is used in this preferred embodiment, but a fixed orifice or a regulating valve such as a pinch valve may be used as a diaphragm. When using a fixed orifice, the pressure reducing valves 7 and 8 may be used as a flow regulating valves by adjusting the manipulation air pressure. Those used as above mentioned diaphragm parts may be general-purpose ones which are of daily use.

The back pressure valve 9 acts to absorb fluctuation of the pressure in the fluid on the downstream side of the valve and to keep the pressure on the upstream side constant all the time. Also, the adjustment of the manipulation air pressure allows the pressure on the upstream side of the back pressure valve 9 to be adjusted and maintained at an arbitrary pressure. Preferably, an automatic valve which can make adjustment to an arbitrary pressure with an air pressure signal or an electric signal is particularly effective.

Reference numeral 10 is an ultrasonic flow meter for measuring the flow rate of the fluid in the mixing line 3 and converts a measured value of the fluid to an electric signal. In this preferred embodiment, an ultrasonic flow meter is used, but generally used flow meters including Karman vortex type flow meter, impeller type flow meter, electromagnetic flow meter, differential pressure type flow meter, volumetric flow meter, hot wire flow meter or mass flow meter may be used.

Next, based on FIGS. 1 and 3, the action of the above preferred embodiment will be described.

In the first supply line 1, the fluid A is fed by pressure by the pump 11 and flowed into the pressure reducing valve 7. The fluid A has its pulsation suppressed in the pressure reducing valve 7 and its pressure reduction degree adjusted and then, flows into the needle valve 5 from the pressure reducing valve 7 and is supplied to the merging point 4. On the other hand, in the second supply line 2, the fluid B is supplied to the merging point 4 in the same action as the first supply line 1. The differential pressure before and after the needle valves 5 and 6 of each of the supply lines 1 and 2 determines the supply flow rate to the merging point 4. Varying the opening areas of the needle valves 5 and 6 can regulate the flow rates in a wide range.

Next, each of the fluids A and B supplied to the merging point 4 flows into the back pressure valve 9 of the mixing line 3. By the action of the back pressure valve 9 at this time, the pressure on the upstream side of the back pressure valve 9, that is, from the downstream side of each of the needle valves 5 and 6 to the back pressure valve 9 can be kept constant even if the pressure on the downstream side of the back pressure valve 9 is fluctuated, and each of the needle valves 5 and 6 can keep the differential pressure and the fluids A and B of each of the supply lines 1 and 2 are supplied to the merging point 4 in a predetermined amount in the stable state all the time. The fluid having passed through the back pressure valve 9 is measured by the flow meter 10 in real time, and the measured value of the flow rate is converted to an electric signal. Moreover, if the pressure reducing valves 7 and 8 and the back pressure valve 9 are automatic valves, the electric signal is fed back to the pressure reducing valves 7 and 8 or the back pressure valve 9 for adjustment of the pressure reduction degree so that the flow rate of the mixing line 3 can be controlled.

If a nozzle or the like for supply to a use point or the like is provided at the end of the mixing line 3 in this state, for example, adhesion to the nozzle of foreign substances such as air bubbles might raise the pressure at the end of the mixing line 3, but the action of the back pressure valve 9 keeps constant the pressure from the downstream side of each of the needle valves 5 and 6 of each of the supply lines 1 and 2 to the upstream side of the back pressure valve without being affected by fluctuation of the pressure on the downstream side of the back pressure valve 9. And the differential pressure before and after the needle valves 5 and 6 is not fluctuated but a set flow rate can be supplied to the mixing line 3 with accuracy, and an accurate mixing ratio can be maintained. Also, even if various valves are provided in series or parallel at the end of the mixing line 3 and opened/closed, for example, the accurate mixing ratio can be maintained with the same action as the above without being affected by the fluctuation of the pressure on the downstream side of the back pressure valve 9.

Here, if the mixing ratio is to be changed by increasing the flow rate of the fluid B in the second supply line 2 while the fluid A in the first supply line 1 is fixed at the set flow rate, the flow rate is increased by adjusting the pressure reducing valve 8 or the needle valve 6 on the second supply line 2. But at this time, the first supply line 1 receives the back pressure from the second supply line 2 side, and the pressure from the merging point 4 to the downstream side of the pressure reducing valve 7 is also raised. By the influence of this pressure, if the back pressure valve 9 is not present, the supply flow rate of the fluid A in the first supply line 1 is decreased or cannot be supplied. But in this preferred embodiment, the action of the back pressure valve 9 keeps constant the pressure from the upstream side of the back pressure valve 9 to the downstream side of the needle valves 5 and 6 without being affected by the fluctuation of pressure on the downstream side. Thus, the fluid A of the first supply line 1 is not affected by the pressure of the fluid B of the second supply line 2, but the mixing ratio can be changed easily with high accuracy. Also, in the case where the mixing ratio is to be changed by decreasing the flow rate of the fluid B of the second supply line 2, the mixing ratio can be similarly changed easily with high accuracy.

By the above action, when the mixing ratio of the fluid in the mixing line 3 is to be changed, the mixing ratio can be changed without pump control of the fluid in the supply line, and only by adjusting the flow rate of one supply line, the mixing ratio can be changed easily and accurately with the fluid supplied.

Also, by setting the pressure of the upstream sides of the needle valves 5 and 6 of each of the supply lines 1 and 2 at the same value, the total flow rate can be changed by changing the opening area of the back pressure valve 9.

Figure 2:
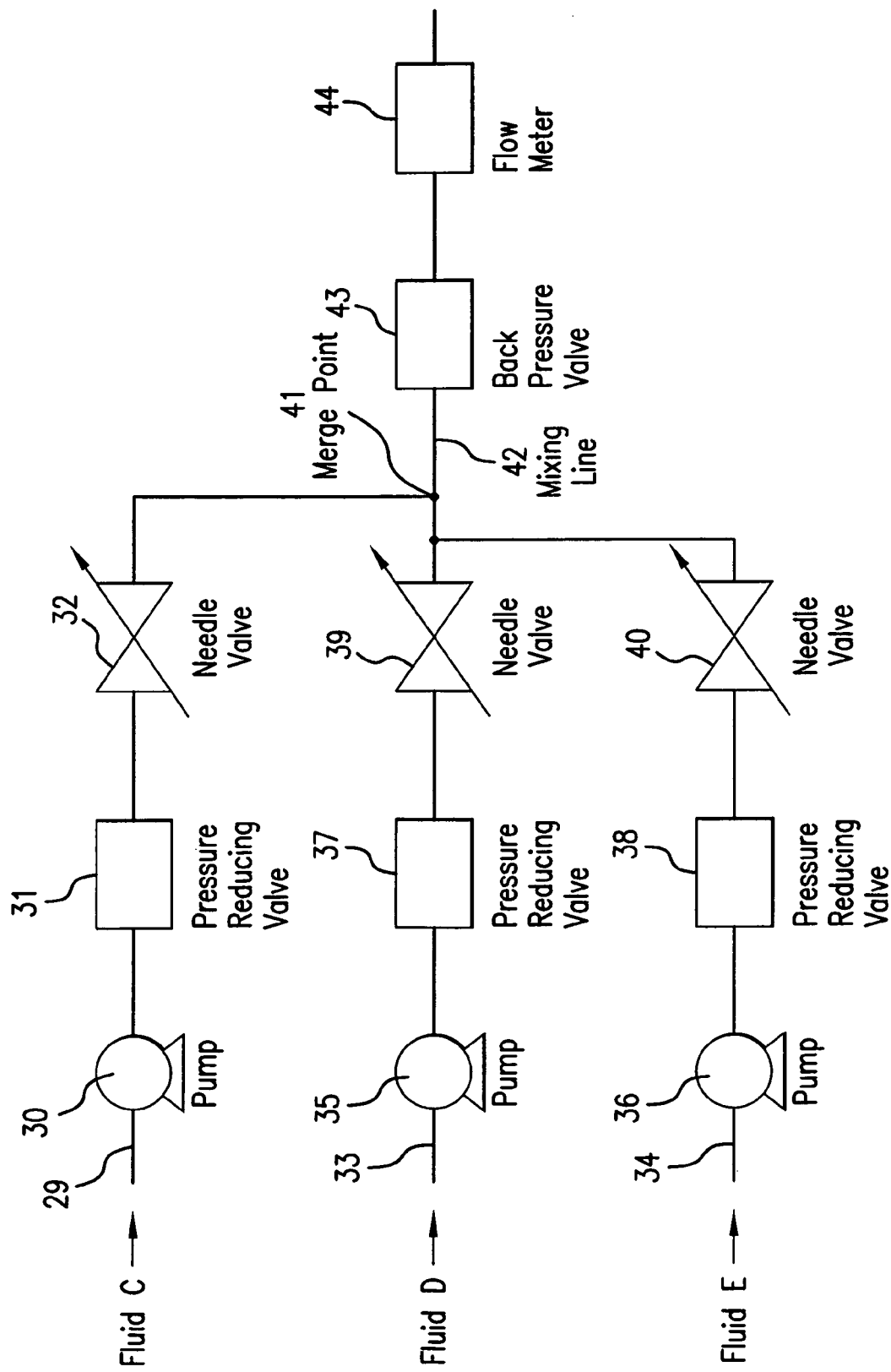
FIG. 2 is a block diagram schematically showing a second preferred embodiment of the present invention.

Next, a second preferred embodiment of the present invention will be described based on FIG. 2. Reference numeral 29 is a first supply line through which a fluid C is flowing, in which a pump 30, a pressure reducing valve 31 and a needle valve 32, which is a diaphragm, are arranged in series from the upstream side. Reference numeral 33 is a second supply line through which a fluid D is flowing, and reference numeral 34 is a third supply line through which a fluid E is flowing, in which pumps 35 and 36, pressure reducing valves 37 and 38 and needle valves 39 and 30, which are diaphragms, are arranged in series from the upstream side as in the first supply line 29. Reference numeral 41 is a merging point, where the fluids C, D and E supplied in a fixed amount, respectively, are merged in the final stage. Reference numeral 42 is a mixing line, which is a line subsequent to the merging point 41. In the mixing line 42, a back pressure valve 43 and a flow meter 44 are arranged in series. The description and action of the members arranged in each of the lines are the same as in the preferred embodiment 1 and will be omitted.

Figure 4:
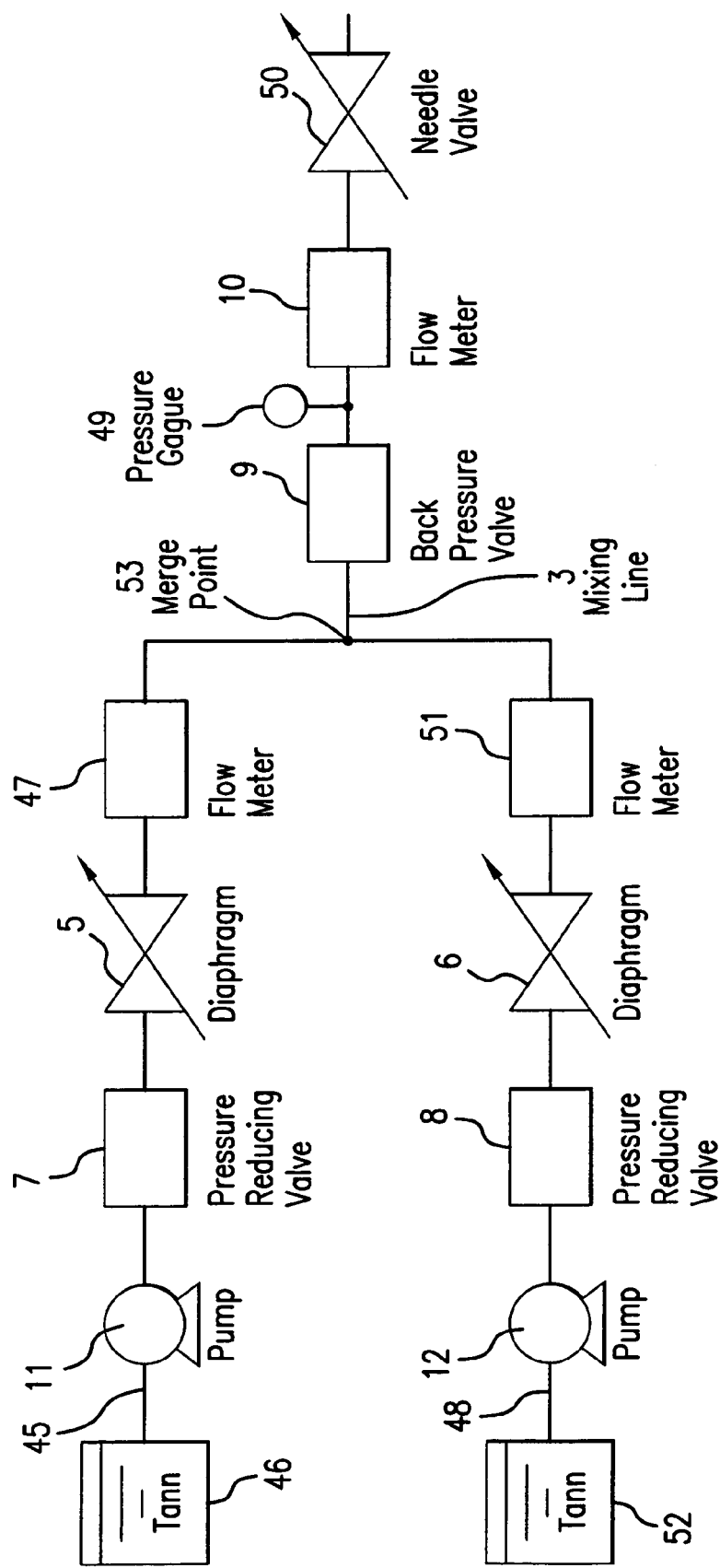
FIG. 4 is a block diagram schematically showing a testing device for measuring stability of a flow rate of a supply line.

Next, a test for measuring over time whether the fluids in the supply lines are supplied stably with variations in pressure on the downstream side subsequent to the back pressure valve in the fluid mixer of the present invention was conducted as follows using an example apparatus shown in FIG. 4.

To the first supply line 45, water colored in red at a room temperature was flowed. A supersonic flow meter 47 was arranged for measuring the flow rates of a tank 46, the pump 11, the pressure reducing valve 7, the needle valve 5 and the red-colored water from the upstream side of the first supply line 45. Also, to the second supply line 48, water colored in blue at a room temperature was flowed. The same members as in the first supply line 45 were arranged in the second supply line 48. Moreover, in the mixing line 3, the back pressure valve 9, a pressure gauge 49, the supersonic flow meter 10 and a needle valve 50 for fluctuating the pressure on the downstream side subsequent to the back pressure valve 9 were arranged. An apparatus excluding the back pressure valve 9 in the mixing line 3 of the example apparatus was used as a comparative example apparatus.

In the first supply line 45, the pump 11 is set to a discharge pressure of 0.3 MPa and the pressure reducing valve 7 to a manipulation air pressure of 0.1 MPa. The opening degree of the needle valve 5 was adjusted, and the flow rate of the red-colored water in the first supply line 45 was set to 20 mL/min when measured with the supersonic flow meter 47. In the second supply line 48, as in the first supply line 45, the pump 12 is set to a discharge pressure of 0.3 MPa and the pressure reducing valve 8 to a manipulation air pressure of 0.1 MPa. The opening degree of the needle valve 6 was adjusted, and the flow rate of the blue-colored water in the second supply line 48 was set to 120 mL/min when measured with a supersonic flow meter 51. The opening degree of the needle valve 50 is gradually throttled from this state, and rise in pressure on the upstream side of the needle valve 50 (back pressure of the back pressure valve 9) was measured by the pressure gauge 49 and the flow rates of each of the supply lines 45 and 48 by the supersonic flow meters 47 and 51, respectively, over time.

Figure 5:
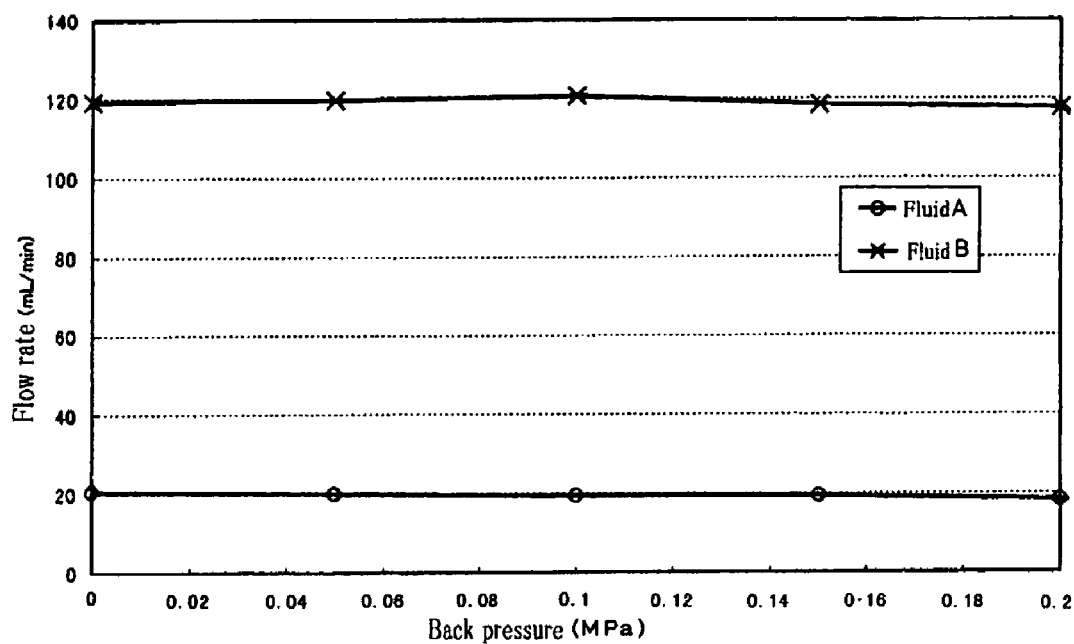
FIG. 5 is a graph showing the measurement results of the flow rate and back pressure of a device of the preferred embodiment.
Figure 6:
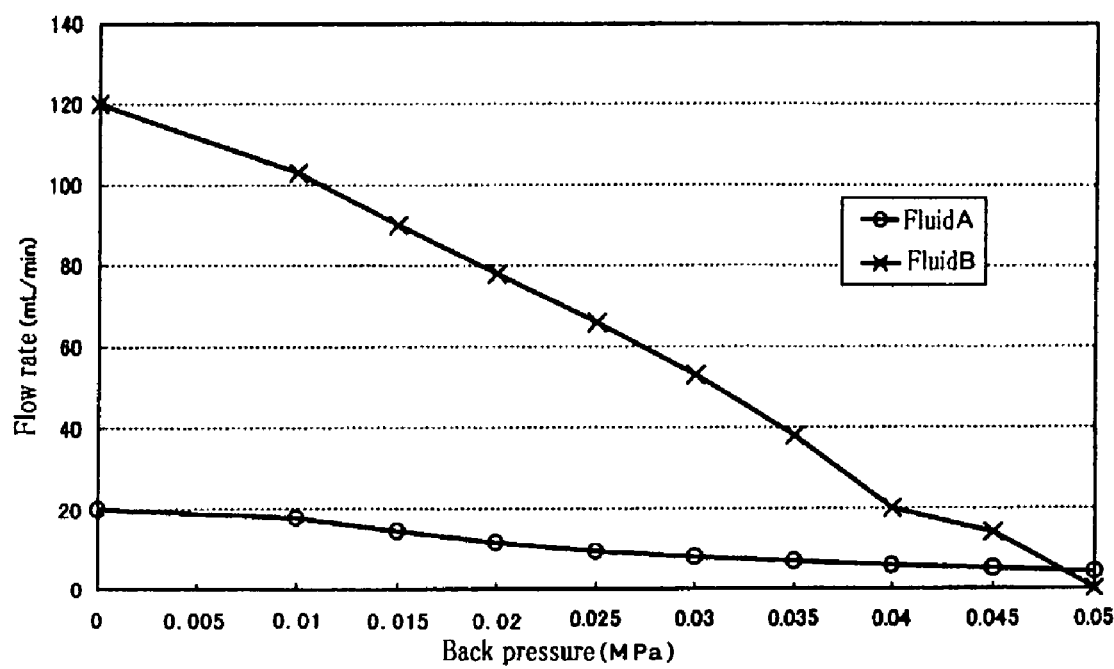
FIG. 6 is a graph showing the measurement results of the flow rate and back pressure of a device of the comparative example.
Figure 7:
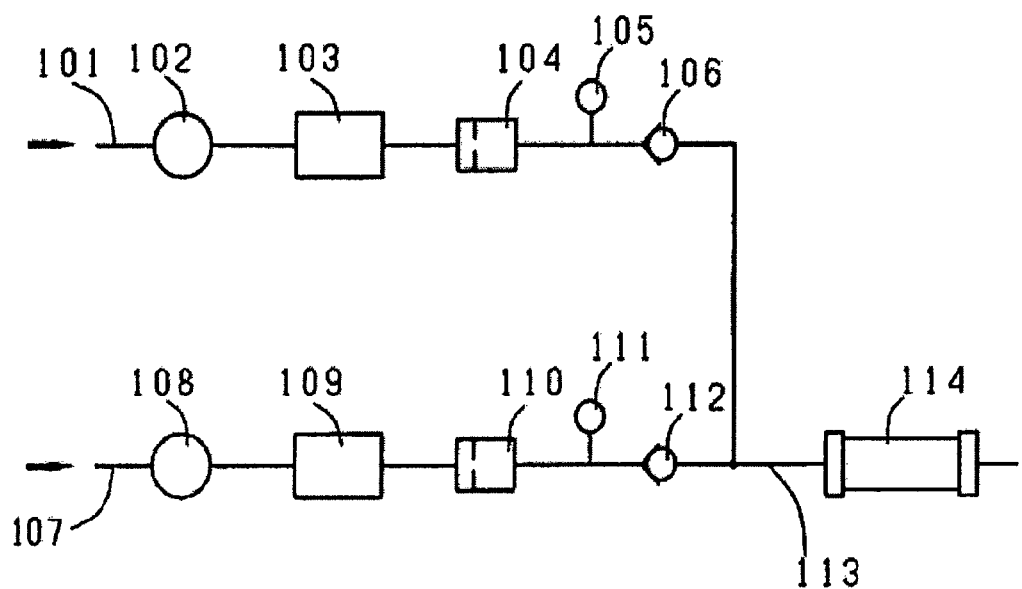
FIG. 7 is a schematic diagram of a prior art mixing device.

As a result, as obvious from the graph in FIG. 5, in the example apparatus (with the back pressure valve 9), the flow rate of each of the supply lines was not changed even if the back pressure is raised to 0.2 MPa and supplied in a fixed amount to the mixing line 3 constantly and with high accuracy. In the meantime, as obvious form the graph in FIG. 6, in the comparative apparatus (without the back pressure valve 9), when the opening degree of the needle valve 50 was throttled and the back pressure was raised, each of the flow rates was lowered and fixed-amount supply to the mixing line 3 became impossible.

The present invention is constituted as above and its use provides the following excellent effect.

(1) Even if the pressure on the downstream side of the back pressure valve in the mixing line is fluctuated by opening/closing of the valve in the mixing line or the like, a fixed amount of fluids in each of the supply lines can be supplied with high accuracy, and highly accurate mixing ratio can be maintained. Particularly, that is effective when highly accurate micro flow rate, concentration or mixing ratio is needed.

(2) The mixing ratio in the mixing line can be changed only by changing the flow rate of the supply line without pump control of the fluid in the supply line.

(3) The mixing ratio in the mixing line can be changed only by adjusting the flow rate of one of the supply lines in the state where the fluids are being supplied.

(4) The total flow rate can be adjusted in the state where the fluids are being supplied while the mixing ratio of the mixing line is maintained with high accuracy.

What is claimed is:

1. A liquid mixer comprising pumps for pressure feeding liquids flowing through at least two supply lines to a mixing line at an arbitrary ratio, each supply line comprising a diaphragm, selected from the group consisting of a needle valve, a fixed orifice, and a regulating valve, for adjusting the flow rate of the liquids provided on the upstream side from a point where said at least two supply lines are merged to the mixing line and a pressure reducing valve comprising an automatic valve and being positioned further upstream of said diaphragm and in series therewith, and a back pressure valve comprising an automatic valve, fluctuations of the pressure in the liquids on the downstream side of the back pressure valve being absorbed in said mixing line.

2. The liquid mixer of claim 1, further comprising a flow meter, wherein the back pressure valve and a flow meter are arranged in series in the mixing line.

3. A liquid mixer for pressure feeding liquids with pumps, comprising:
    at least two separate supply lines through which respective liquids flow at an arbitrary ratio, the supply lines merging at a merge point into a mixing line, each supply line having
    a diaphragm for adjusting the flow rate of the respective fluid and located upstream of the merge point, the diaphragm being selected from the group consisting of needle valves, fixed orifices, and regulating valves,
    a pressure reducing valve further upstream of the diaphragm and in series therewith, and
    a pump positioned upstream of the pressure reducing valve and in series therewith for pumping the respective liquid;
    a back pressure valve located immediately downstream of the merge point, the back pressure valve operating to absorb fluctuations in the liquid pressure in the mixing line downstream of the back pressure valve; and
    a flow meter positioned downstream of the back pressure valve and in series therewith,
    whereby, in operation, the liquid pressures of the at least two supply lines on the upstream side of the merge point is maintained constant.

4. The fluid mixer of claim 3, further comprising:
    a needle valve positioned downstream of the flow meter for regulating the output of the fluid mixer.

* * * * *